United States Patent
Takahashi et al.

(10) Patent No.: US 6,881,473 B2
(45) Date of Patent: Apr. 19, 2005

(54) LIGHT DIFFUSING FILM AND METHOD FOR PREPARATION THEREOF

(75) Inventors: Hiromitsu Takahashi, Otsu (JP); Motoyuki Suzuki, Otsu (JP)

(73) Assignee: Toray Industries, Inc. (JP)

(*) Notice: Subject to any disclaimer, the term of this patent is extended or adjusted under 35 U.S.C. 154(b) by 54 days.

(21) Appl. No.: 10/203,688

(22) PCT Filed: Sep. 6, 2001

(86) PCT No.: PCT/JP01/07734

§ 371 (c)(1), (2), (4) Date: Aug. 9, 2002

(87) PCT Pub. No.: WO02/48757

PCT Pub. Date: Jun. 6, 2002

(65) Prior Publication Data

US 2003/0068512 A1 Apr. 10, 2003

(30) Foreign Application Priority Data

Dec. 12, 2000 (JP) ........................... 2000-378106

(51) Int. Cl.$^7$ ............... B32B 5/00; B32B 7/00; B32B 7/02; B32B 27/18; B32B 27/36

(52) U.S. Cl. ........... 428/212; 428/213; 428/480; 428/323; 428/327; 428/338; 428/339; 264/288.4; 264/290.2; 359/577; 359/580; 359/586; 359/599; 359/615

(58) Field of Search ................ 428/212, 480, 428/483, 213, 323, 327, 338, 339; 264/288.4, 290.2; 359/838, 884, 577, 580, 584, 586, 615, 599

(56) References Cited

U.S. PATENT DOCUMENTS

| 5,783,120 A | * | 7/1998 | Ouderkirk et al. ......... 264/1.34 |
| 5,825,543 A | * | 10/1998 | Ouderkirk et al. .......... 359/494 |
| 5,867,316 A | * | 2/1999 | Carlson et al. ............. 359/500 |
| 6,057,961 A | * | 5/2000 | Allen et al. ................. 359/494 |
| 6,256,146 B1 | * | 7/2001 | Merrill et al. .............. 359/500 |
| 6,517,914 B1 | * | 2/2003 | Hiraishi ...................... 428/1.1 |

FOREIGN PATENT DOCUMENTS

| EP | 1 089 114 A2 | * | 4/2001 |
| JP | 05-131601 | | 5/1993 |
| JP | 06-347616 | | 12/1994 |
| JP | 08-217895 | | 8/1996 |
| JP | 11-199798 | | 7/1999 |
| JP | 2000-239541 | * | 9/2000 |
| JP | 2001-031774 | * | 2/2001 |

* cited by examiner

*Primary Examiner*—Vivian Chen
(74) *Attorney, Agent, or Firm*—Piper Rudnick LLP

(57) ABSTRACT

A light diffusing film including a film including crystalline polymer compound C laminated to at least one face of an internal light-diffusing film including an islands-in-a-sea structure including a sea component of thermoplastic resin A and an islands component of thermoplastic resin B, wherein thermoplastic resins A and B have different refractive indexes.

12 Claims, No Drawings

LIGHT DIFFUSING FILM AND METHOD FOR PREPARATION THEREOF

TECHNICAL FIELD

The present invention relates to a light diffusing suitable for use in a liquid crystal display backlight or in illumination equipment, etc.

TECHNICAL BACKGROUND

In recent years, displays employing liquid crystals have become commonly used as the display means in personal computers, televisions and mobile phones, etc. Since these liquid crystal displays are not themselves light-emitters, display is made possible by shining a light from the rear using a backlight. For the backlight, a planar light source construction, referred to as the sidelight type or the direct type, is adopted which does not merely shine a light but meets the requirement that the entire image area be uniformly illuminated. In liquid crystal display applications used for example in notebook type personal computers where a thin, compact shape is required, there is employed the sidelight type of backlight, that is to say the type where illumination takes place from the side faces in terms of the image area. Generally speaking, in this sidelight type backlight, there is used a light guide panel system employing a light guide plate which uniformly propagates and diffuses the light to achieve uniform illumination of the entire liquid crystal display. On this light guide plate there is inscribed a pattern so that light incident from the side faces emerges in the perpendicular direction and therefore there is a non-uniform distribution of the light due to this pattern. Consequently, in this type of liquid crystal display, in order to obtain a high quality image of enhanced planar uniformity, it is necessary to place a light diffusing film on the light guide plate to make the light uniform.

The properties required of such a light diffusing film are, of course, high light diffusion, together with extremely high light transmittance. By raising the light transmittance, it is possible to utilize the light from the backlight very efficiently, so it is possible to achieve higher brightness and lower power consumption.

As examples of the light diffusing films used hitherto, there are (1) the diffusing sheet (light diffusing film) described in JP-A-4-275501 which is obtained by moulding a transparent thermoplastic resin in the form of sheet, after which processing is carried out to physically provide projections/depressions at the surface; (2) the light diffusing film described in JP-A-6-59108 which is obtained by providing a coating of a light diffusing layer, comprising a transparent resin containing fine particles, on a transparent substrate film of for example polyester resin; (3) the light diffusing plate (light diffusing film) described in JP-A-6-123802 which is obtained by the melt-blending of beads with a transparent resin and then performing extrusion; and (4) the light diffusing sheet (light diffusing film) with an islands-in-a-sea structure described in JP-A-9-311205 which is obtained by kneading at least two types of transparent thermoplastic resin. The light diffusing films (1) and (2) above, where the light diffusing effect is obtained by means of projections/indentations or a coated light diffusing layer at the film surface, are so-called surface light diffusing films. On the other hand, the light diffusing films (3) and (4) above are light diffusing films with a light diffusing component in at least the substrate interior.

Of these, the light diffusing film (2) above which is obtained by coating a light diffusing layer onto a transparent substrate film is currently the form generally used, and normally as the transparent substrate film there is employed biaxially-drawn polyethylene terephthalate film. This biaxially-drawn polyethylene terephthalate film is known to be outstanding in its mechanical strength, heat resistance, transparency and flatness, etc, and by using this film as the substrate such properties can also be manifested in the light diffusing film.

The properties demanded in the liquid crystal display components field in the future will include still higher performance and efficiency, and further reductions in thickness and weight, and in order to meet these demands there is being considered, for example, performance enhancement by surface processing and also film lamination. However, the light diffusing films obtained by (1) and (2) above have considerable surface unevenness and their lamination with other films is difficult. Furthermore, surface processing is impossible in practical terms. In the case of the light diffusing films obtained by (3) and (4) above, basically the diffusion effect is obtained by a diffusing component present in the film interior, and so the surface is flatter than in the case of the films in (1) and (2) but, nevertheless, there remains unevenness due to the presence in the vicinity of the surface layer of the beads or the thermoplastic resin from which the islands in the islands-in-a-sea structure are composed, so it is hard to say that the film flatness is adequate. Moreover, in the case of the kneading of inorganic particles or crosslinked organic particles such as beads, as in (3) above, depending on the shape and size thereof there may be blockage of the filters which are inserted in the extruder with the objective of removing impurities, and again depending of the amount of such particles added the fluidity of the resin composition at the time of melting may be impaired so that film formation is impossible.

Again, the films in (3) and (4) above are both films with considerable amounts of a diffusing component (beads for example) in the interior, so since no support is provided there is a tendency for the strength and in particular the flexural strength to be low. For example, creases are readily introduced and whitening produced, or there may be creasing or splitting at the edges at the time of cutting.

In addition, these diffusing films are for example incorporated into a backlight unit, but the component temperature becomes extremely high when the backlight is illuminated for a long period. However, the light diffusing films obtained in (3) and (4) above have poor heat resistance so, when incorporated into the backlight and used over a long period, distortion occurs, with the result that a marked luminance variation of the backlight is brought about.

SUMMARY OF THE INVENTION

Hence, the present inventors have carried out a painstaking investigation to develop a light diffusing film which, while fully employing the properties of conventional drawn film comprising a crystalline polymer compound such as a polyester resin which is outstanding in its mechanical strength, heat resistance, transparency and flatness, etc, also combines the benefits internal diffusion can provide such as high performance, high efficiency, thinness and weight reduction, as a result of which they have discovered a light diffusing film which, while the surface is smooth, is outstanding in terms of its light transmittance, light diffusion, mechanical strength, heat resistance and productivity. The present invention is based on this discovery.

The objective of the present invention lies in providing a light diffusing film which has a smooth surface and, furthermore, is outstanding in its light transmittance, light diffusion, mechanical strength and productivity, together with a method for the production thereof.

DETAILED DESCRIPTION

The light diffusing film of the present invention is a light diffusing film characterized in that a drawn film comprising crystalline polymer compound C is laminated to at least one face of an internal light-diffusing film comprising at least two types of thermoplastic resin of different refractive indexes and having an islands-in-a-sea type structure which comprises a sea component of thermoplastic resin A and an islands component of thermoplastic resin B.

Furthermore, as a practical embodiment of the light diffusing film of the present invention there is the light diffusing film which is characterized in that when a collimated beam of visible light is incident perpendicular to the film face and, taking as the measurement position the opposite face at the position of incidence, measurement is carried out of the brightness of the light beam emerging from said measurement position, if the brightness obtained in the perpendicular direction is taken as $L_0$ and the brightness obtained in a direction inclined 30° from the perpendicular direction centred on the measurement position is taken as $L_{30}$, the diffusion coefficient $\beta$ defined by the following formula (3) satisfies the relation $-1.5 < \beta$ and, furthermore, the surface haze is no more than 10%.

$$\beta = \log_{10} \frac{L_{30}}{L_0} \tag{3}$$

Moreover, another practical embodiment of the light diffusing film of the present invention is a light diffusing film which is characterized in that, on one or both sides of a light diffusing film having at least a light diffusing layer, there is laminated a resin layer comprising thermoplastic resin of melting point higher than the thermoplastic resin contained in the light diffusing film.

The light diffusing film of the present invention is characterized by the fact that a drawn film of crystalline polymer compound C is laminated to at least one surface side. In such circumstances, the drawn film may be laminated to either surface but preferably the drawn film is laminated to both surfaces. The crystalline polymer compound C is a polymer compound which displays a melting point and, specifically, there can be used for example a polyester resin or a polyolefin resin but, of these, from the point of view of mechanical strength, heat resistance and transparency, the use of polyethylene terephthalate or polyethylene-2,6-naphthalate is preferred. The crystalline polymer compound C is preferably uniaxially or biaxially drawn but it is particularly preferred that it be biaxially drawn.

The drawing of a polymer compound is normally carried out at a temperature above the glass transition temperature. In the case of a crystalline polymer compound, by performing a heat treatment (heat setting) after the drawing, the drawn polymer is made thermally stable and exhibits heat resistance in the temperature region up to the melting point. In the case of a non-crystalline (amorphous) polymer, no melting point is shown and flowability is exhibited in the temperature region above the glass transition temperature, so this is undesirable. For example, in the case of the preferably-employed polyethylene terephthalate film, the melting point is high at around 260° C., so when drawn such film is laminated to the surface of an internal light-diffusing film and then the film incorporated into a backlight unit, it is resistant to thermal deformation even when used over a long period.

Furthermore, since the drawn film shows a high tensile modulus, by lamination of drawn film the mechanical strength of the laminated film obtained, in particular its flexural strength, is enhanced. Hence, creases are not readily introduced into the film and there is no whitening. Furthermore, there is an improvement in terms of problems such as creasing and splitting of the edges at the time of cutting, etc.

Moreover, by the lamination of this drawn film to the internal light-diffusing film, it is possible to obtain a light diffusing film of low mean surface roughness.

Again, it is preferred that the drawn film comprising crystalline polymer compound C be substantially non light-diffusing. Substantially non light-diffusing means that, at the thickness employed, the haze is no more than 10%.

In the light diffusing film of the present invention, an internal light-diffusing film is covered on at least one face with drawn film comprising crystalline polymer compound C, so it may sometimes be referred to as the "internal layer".

The internal light-diffusing film which is the internal layer of the light diffusing film of the present invention has an islands-in-a-sea structure comprising at least two types of thermoplastic resin of different refractive indexes (the thermoplastic resin from which the sea component is composed is referred to as thermoplastic resin A and the thermoplastic resin from which the islands component is composed is referred to as thermoplastic resin B). The thermoplastic resin A from which the sea component is composed may be a single resin or a mixture of two or more types of resin but, in either case, it is preferably essentially non light-diffusing.

In the case of the thermoplastic resin B from which the islands are composed, all these islands may be of the same single polymer or there may be present a number of islands of a different single polymer and, furthermore, the islands may comprise a mixed material. In the case of islands of a mixed material, the interior should be uniformly mutually compatible and it should be substantially non light-diffusing.

In order to enhance the diffusion of the light diffusing film, it is necessary that the refractive indexes of the sea component and islands component resins be different. Where these two components have different refractive indexes, refraction takes place at their interface and incident light rays are scattered. The absolute difference in the refractive indexes of thermoplastic resin A and thermoplastic resin B is preferably in the range 0.01 to 0.4, more preferably 0.05 to 0.4 and most preferably 0.1 to 0.4. There are no particular restrictions on which of thermoplastic resin A and thermoplastic resin B has the greater refractive index. Furthermore, the refractive indexes of thermoplastic resin A and thermoplastic resin B can both be selected from within the range 1.3 to 1.7 such that they satisfy the aforesaid condition. Again, light diffusion will also depend on the volume fraction of the islands component and the film thickness, and an enhancement can be realized by increasing these values. Put another way, control of the diffusion is possible by selection of these conditions.

In the islands-in-a-sea structure from which the light diffusing film is composed, it is preferred that the form of the islands component be spherical. Here spherical means a body with a spherical surface, and while the islands need not necessarily be perfectly spherical it is preferred, in terms of obtaining uniform scattering, that they be perfectly spherical with no anisotropy in terms of shape. Again, the volume fraction of the islands component in the light diffusing film is preferably no more than 50%, with 10–40% further preferred.

The size of the islands component is preferably 1 to 50 μm, more preferably 1 to 30 μm and most preferably 1 to 20 μm. In order to achieve an enhancement in terms of the transparency, which is an important factor in terms of the light diffusing film performance, it is important to take into consideration the wavelength of the light and the size of the islands (the dispersion diameter), and such an enhancement can be realized by controlling the size to within the aforesaid range. Where the size of the islands component is less than 1 μm, there may be colouring of the transmitted light, so by controlling the size to within the aforesaid range it is also possible at the same time to suppress transmitted light colouration.

The average particle diameter of the islands component can be measured by the following method. The light diffusing film is observed from the surface direction using a transmission type optical microscope. 200 light diffusing particles are randomly selected from within the field of view and, using an image processor or the like, the mean particle diameter is measured. Where the particles are not truly circular, their area is determined after which the diameter is obtained by conversion of the area to that of a circle.

In the internal light-diffusing film of the present invention, light diffusion is obtained by the dispersion of the thermoplastic resin B, from which the islands component is composed, in thermoplastic resin A, from which the sea component is composed, but there can also be added and dispersed other components which aid light diffusion or components which confer other functions. Examples of such other additives are inorganic particles, organic particles and air bubbles, etc. However, it is preferred that the light transmittance not be markedly lowered. For example, additives with high light absorption, or air bubbles of flat shape which line up with their faces parallel to the thickness direction, are undesirable. In terms of shape, it is preferred that these other additives also be spherical.

In the present invention, in order to provide the internal light-diffusing film with an islands-in-a-sea structure, it is necessary to use a combination of non-compatible resins, and it is preferred that the difference in solubility parameter (SP value) between thermoplastic resin A and thermoplastic resin B be 2 $(MPa)^{0.5}$ or greater. The SP value is an index of the ease of mixing when polymer compounds are mixed together, and the nearer the difference in SP values is to 0 for a particular combination of polymer compounds to be mixed together, the more compatible they are. Thus, in the present invention it is important that the difference in SP values be large. Furthermore, the SP value has a proportional relation to interfacial tension, and when producing an islands-in-a-sea structure it is also associated with control of the particle size of the dispersion. In order to control the size of the islands component to lie within the range described above, a difference in SP values of 2 $(MPa)^{0.5}$ or more is required. Where it is less than 2 $(MPa)^{0.5}$ the islands component is too small, which is undesirable.

It is important that the difference in SP values between thermoplastic resin A and the crystalline polymer compound C which is laminated to the surface be no more than 1 $(MPa)^{0.5}$. It is preferred that the crystalline polymer compound C and the thermoplastic resin A firmly adhere together. If there is used a combination of resins where the difference in SP values is greater than 1, following lamination the surface layer readily separates away and so this is undesirable.

It is important that the aforesaid conditions relating to the thermoplastic resin B from which the islands component is composed in terms of thermoplastic resin A from which the sea component is composed, and the conditions relating to the surface layer crystalline polymer compound C in terms of thermoplastic resin A, be satisfied. With regard to the crystalline polymer compound C and the thermoplastic resin B, providing they can be simultaneously extruded there are no particular restrictions thereon. Reference here to 'can be simultaneously extruded' means that at the extrusion temperature, both with possess fluidity and neither will substantially undergo thermal decomposition. Furthermore, there will be substantially no mutual chemical reaction between them.

It is also preferred that thermoplastic resin A exhibits fluidity at temperatures directly below the melting point $Tm_c$ of the surface layer crystalline polymer compound C. That is to say, in the case where thermoplastic resin A is a crystalline polymer compound, the melting point $Tm_a$ of resin A will be lower than the melting point $Tm_c$ of crystalline polymer compound C and at temperatures directly below $Tm_c$, only resin A will melt and show fluidity without the surface layer melting. Again, in the case where thermoplastic resin A is a non-crystalline polymer compound, providing that the heat distortion temperature $Tm_a'$ of resin A is lower than $Tm_c$ then, at temperatures directly below $Tm_c$, the surface layer does not melt but resin A shows a fluid state. Reference here to the heat distortion temperature means the temperature measured based on ASTM-D648 at a load of 1.82 MPa for example.

Taking the surface layer crystalline polymer compound C melting point as $Tm_c$ and its glass transition as $Tg_c$, and taking the melting point of the resin with the highest melting point amongst the thermoplastic resins used in the internal light-diffusing film as T2, in the present invention when $Tm_c > T2$ and by carrying out heat treatment at a temperature T which satisfies the relations $Tm_c > T > T2$ and $T > Tg_c$, it is possible to readily secure a flat surface irrespective of the form of the interior. In the case where $Tm_c < T2$, when treatment is carried out at a temperature T which satisfies $T < Tm_c$, the resin in the interior cannot be processed so it is not possible to achieve a flattening of the surface. Furthermore, if heat treatment is carried out at a temperature T where $Tm_c < T$, problems arise such as surface tackiness, so this is undesirable. Now, the thermoplastic resin melting point T2 denotes the melting point in the case of a crystalline polymer, while in the case of a non-crystalline polymer it denotes the heat distortion temperature.

As examples of the thermoplastic resin A and thermoplastic resin B used in the present invention, there are polyesters such as polyethylene terephthalate, polyethylene-2,6-naphthalate, polypropylene terephthalate and polybutylene terephthalate, olefins such as polyethylene, polypropylene and polymethyl-pentene, polycarbonates, polystyrene, polyamides, polyethers, polyesteramides, polyetheresters, polyvinyl chloride, poly(meth)acrylate esters and copolymers in which these are the chief component, or mixtures of such resins. Providing that they satisfy the conditions given above, resins can be employed without any particular restrictions, irrespective of whether they are crystalline or non-crystalline. Examples of preferred combinations are the combination of a polyester such as polyethylene terephthalate, polyethylene-2,6-naphthalate or copolymer in which these are the main component, or a mixture of such resins, as thermoplastic resin A, and a polyolefin resin such as polyethylene, polypropylene, polymethylpentene or copolymer in which these are the main component, or a mixture of such resins, as thermoplastic resin B.

It is more preferred that a non-crystalline resin be used as thermoplastic resin A in the present invention. In the present invention a non-crystalline resin is a resin identified by the following method. First of all, the resin is heated from room temperature to 320° C. in an atmosphere of nitrogen, and held in this state for 10 minutes. Next, it is cooled rapidly to the vicinity of room temperature and directly re-heated from room temperature to 320° C. at a heating rate of 5° C./min using a differential scanning calorimeter (DSC), and the endothermic curve due to crystal fusion determined. Where an exothermic peak (crystallization peak) due to crystallization is observed in the curve, the resin is taken to be a crystalline resin and where none is observed the resin is taken to be a non-crystalline (amorphous) resin.

As non-crystalline resins preferably employed in the present invention, there can be appropriately used for example polyethylene terephthalate in which cyclohexanedimethanol has been copolymerized, acrylonitrile-styrene copolymer, acrylonitrile-butadiene-styrene copolymer, polymethyl methacrylate, polycarbonate, modified polyphenylene ether, polyarylate, polysulphone, polyetherimide, polyamide-imide, polyimide or a copolymer in which these are the chief component, as well as mixtures of these resins. Amongst these examples, polyester resins such as polyethylene terephthalate in which cyclohexanedimethanol has been copolymerized, and copolymers containing these as the chief component, or mixtures of such resins, are further preferred. Moreover, polyethylene terephthalate in which 10–40 mol % of cyclohexanedimethanol has been copolymerized, or a polyethylene isophthalate/terephthate copolymer in which 10–40 mol % of cyclohexanedimethanol has been copolymerized, is particularly preferred.

Now, a method could be conceived of not enhancing the heat resistance by lamination of a drawn film but using a resin of extremely high heat resistance as thermoplastic resin A without lamination. However, by this method there also has to be used a resin of extremely high heat resistance as the thermoplastic resin B for forming the islands component so that thermal degradation does not occur at the time of melting, but there is an extremely narrow selection of such combinations of resins so this approach is impractical.

As the crystalline polymer compound C which is laminated to the surface, there is favourably employed for example polyesters such as polyethylene terephthalate, polyethylene-2,6-naphthalate, polypropylene terephthalate and polybutylene terephthalate, polycarbonates, polystyrene, polyolefins such as polyethylene and polypropylene, polyamides, polyethers, polyesteramides, polyetheresters, polyvinyl chloride, copolymers in which these are the chief component or mixtures of such resins. Amongst these, a polyester such as polyethylene terephthalate or polyethylene-2,6-naphthalate, or copolymer containing these as the main component or a blend of such polymers, can be advantageously employed.

It is especially preferred that there be used a thermoplastic resin of melting point at least higher than that of thermoplastic resin A and/or B.

In such circumstances, it is desirable that the melting point of the crystalline polymer compound used on the surface layer side be preferably at least 10° C. and more preferably at least 20° C. higher than the melting point of the thermoplastic resins used in the internal light-diffusing film.

The melting point of these thermoplastic resins can be easily measured using differential scanning calorimetry (DSC), taking the value of the peak in the DSC curve for the endotherm based on crystal fusion as the melting point. Again, it is also possible at the same time to measure the glass transition temperature (Tg). With regard to the glass transition temperature, a change in the specific heat occurs at the time of the change from the resin glassy state to the rubbery state, and this can be identified from the shape of the measurement curve, namely a parallel shift in base line.

For the purposes of enhancing light diffusion performance, it is possible to use as the crystalline polymer compound C, which is laminated to the surface of the light diffusing film, a crystalline polymer compound of different refractive index from that of the thermoplastic resin in the internal light-diffusing film.

Moreover, various types of additives can be added to the light diffusing film of the present invention, within a range such that the effects of the invention are not impaired. The layer to which the additives are added may be the internal light-diffusing layer, the resin layer at the surface which comprises crystalline polymer compound C, or some other layer. As examples of additives incorporated in this way, there are pigments, dyes, optical brightening agents, antioxidants, heat stabilizers, light stabilizers, weathering agents, antistatic agents, release agents, compatibilizing agents and the like.

Furthermore, in the light diffusing film of the present invention, it is preferred that the film thickness of the internal light-diffusing film be at least 50% of the total film thickness, and it is still further preferred that it be 60–95% of the total film thickness. When the internal light-diffusing film which has the diffusion function represents at least 50% of the total film thickness, it is possible to achieve both outstanding diffusion and also a reduction in the film thickness of the diffusion film as a whole. Moreover, even though it constitutes this high proportion of at least 50%, because there is laminated on the surface the drawn film comprising crystalline polymer compound C, the mechanical strength and heat resistance are excellent. In other words, it is possible to reduce the film thickness while retaining mechanical strength and heat resistance, and yet there is still obtained film with outstanding light diffusion.

The light diffusing film of the present invention preferably has a lamination thickness ratio α, as expressed by the following formula (1), of no more than 15, and more preferably the lamination thickness ratio α lies in the range 1 to 13.

$$\alpha = \frac{T_a}{T_b} \qquad (1)$$

(In formula (1), $T_a$=film thickness of the inner layer internal light-diffusing film and $T_b$=total film thickness of film comprising crystalline polymer compound C)

In formula (1), the total film thickness of the film comprising crystalline polymer compound C denotes the film thickness on the one side in the case where there is lamination only at the surface on one side, and it denotes the total for the two sides in the case where there is lamination on both sides.

If the lamination thickness ratio exceeds 15, there is an inadequate effect in terms of the enhancement of mechanical strength due to the lamination of the drawn film, so this is undesirable.

Furthermore, it is desirable that the flexural rigidity M (N.m) satisfies the following formula (2), taking the overall film thickness of the light diffusing film as $T_t$ (m) and the lamination thickness ratio as expressed by formula (1) above as α.

$$M \geq 3 \times 10^8 \times \left(1 - \frac{\alpha^3}{2(\alpha+1)^3}\right) \times T_t^3 \qquad (2)$$

Where the flexural rigidity satisfies formula (2), it is possible to produce a light diffusing film which is outstanding in its mechanical strength. It is further preferred that the following formula (2') be satisfied.

$$M \geq 3.5 \times 10^8 \times \left(1 - \frac{\alpha^3}{2(\alpha+1)^3}\right) \times T_t^3 \qquad (2')$$

Again, in the present invention it is preferred that the internal light-diffusing film and the drawn film comprising crystalline polymer compound C be laminated without interposing an adhesive agent layer. Here, interposing an adhesive agent layer means that the internal light-diffusing film and the drawn film are produced beforehand in separate processes, after which a stage is required in which the two films are stuck together offline. In such circumstances accurate sticking together of the films is required and it is not easy to retain film smoothness and mechanical strength following the uniform application of an adhesive agent layer and then sticking the films together. In addition, the light diffusion, transparency and heat resistance may be reduced by the adhesive agent layer.

The light diffusing film of the present invention also comprises a light diffusing film characterized in that, when a collimated beam of visible light is incident perpendicular to the film face and, taking as the measurement position the opposite face at the position of incidence, measurement is carried out of the brightness of the light beam emerging from said measurement position, if the brightness obtained in the perpendicular direction is taken as $L_0$ and the brightness obtained in a direction inclined 30° from the perpendicular direction centred on the measurement position is taken as $L_{30}$, the diffusion coefficient $\beta$ defined by the following formula (3) satisfies the relation $-1.5 < \beta$, and furthermore the surface haze is no more than 10%.

$$\beta = \log_{10} \frac{L_{30}}{L_0} \qquad (3)$$

As an index of light diffusion, in general the haze (turbidity) obtained using the following formula is often employed. Haze refers to the percentage of the quantity of light which, while incident light from a light source is passing through the sample, is separated from the incident luminous flux and is scattered during transmission. Taking the total light transmittance as $T_t$, the diffuse transmittance as $T_d$ and the direct transmittance as $T_p$, the total light transmittance $T_t$ is given by the following formula.

$$T_t = T_d + T_p$$

Furthermore, the haze $H_t$ is denoted by the following formula:

$$H_t = 100 \times \frac{T_d}{T_t}$$

The higher the haze value, the greater the diffusion of the incident light beam by the sample. Now, explaining light diffusion in a little more detail from a practical viewpoint, the important factor is over how broad a range is the incident light beam scattered. However, haze relates merely to whether or not there is separation from the incident luminous flux, so for a more practical evaluation it is necessary to consider the angle of scatter of the incident light beam. For example, when evaluating two types of sample there is the phenomenon that even though the haze values may be the same the practical diffusion properties are different. This is because the angle of scatter of the incident light beam is different for the two samples.

The scattering coefficient $\beta$ denoted by aforesaid formula (3) is an index enabling the scattering of the incident beam and, thus, the practical light diffusion characteristics as a diffusion film, to be evaluated. By increasing the scattering coefficient $\beta$ above $-1.5$, fully practical light diffusion is obtained. It is still further preferred in terms of diffusion that the scattering coefficient be greater than $-1.0$.

Furthermore, in the case of the light diffusing film of the present invention, when a collimated beam of visible light is incident inclined at 30° to the perpendicular to the film face and, taking as the measurement position the opposite face at the position of incidence, measurement is then carried out of the brightness of the light beam emerging from said measurement position, if the brightness obtained in the perpendicular direction is taken as $L'_0$ and the brightness obtained in the direction parallel to the incident beam and inclined 30° from the perpendicular direction centred on the measurement position is taken as $L'_{30}$, it is preferred that the diffusion coefficient $\gamma$ defined by the following formula (4) satisfies the relation $\gamma < 1$, and still more preferably that $\gamma < 0.75$.

$$\gamma = \log_{10} \frac{L'_{30}}{L'_0} \qquad (4)$$

By making the diffusion coefficient $\gamma$ obtained in relation to a light beam incident at an angle of 30° smaller than 1, there is obtained a light diffusing film which has non-directional uniform light diffusion and not merely uniform light diffusion for a light beam directly from the front.

Again, it is preferred that the surface haze of the light diffusing film of the present be no more than 10%. This surface haze will now be explained.

In the case of the haze explained above, there is that derived from the surface state and that derived from the internal structure of the material. Surface haze in the present invention refers to the former. The former, that is to say the surface haze, denotes the state of light scatter originating in unevenness of the sample surface and surface processing. The latter type of haze is called internal haze and it denotes the state of light scatter originating in added particles and voids present in the sample interior.

The surface haze in the present invention is determined by measuring the haze of a model, produced using a transparent resin, which copies the state of the sample surface layer and which is obtained by the method described later. In this way, it is possible to measure the diffusion effect obtained solely from the influence of surface state.

The surface haze of the light diffusing film of the present invention will be no more than 10%. The surface haze is preferably no more than 8% and still more preferably no more than 5%. In the case of a film where the surface haze exceeds 10%, the film surface is not sufficiently smooth, and it is not possible to ignore the influence of surface state on diffusion. Furthermore, there may be a reduction in performance when surface processing or when sticking to some other component. So this is undesirable. In other words, the light diffusing film of the present invention can be said to utilize only the diffusion effect of the interior and not a diffusion effect based on the surface.

One preferred means for controlling the surface haze to no more than 10% is by employing drawn film as the surface layer. By using drawn film which is substantially non light-diffusing and which does not contain minute particles or the like deposited at the surface, the film surface is smooth and it is readily possible to achieve a surface haze of no more than 10%.

Again, as another preferred means, there is the method whereby, following lamination of any desired thermoplastic resin at the surface, a flat heated surface is employed and hot pressing conducted at a temperature higher than the glass transition temperature of this thermoplastic resin. In this way, surface unevenness is eliminated and a surface haze of no more than 10% is readily achieved.

By satisfying aforesaid formula (3) or formula (4), sufficient light diffusion is shown. Where these formulae are not satisfied, if the film is placed for example on the light guide plate of a backlight, the dots inscribed on the light guide plate are clearly distinguishable, thereby indicating inferior light diffusion.

It is possible to produce a light diffusing film of the internal light-diffusion type which satisfies aforesaid formulae (3) or (4) by, for example, suitable combination of the conditions described above like the difference in the refractive indexes of the thermoplastic resins A and B in the interior layer, the volume fraction thereof and the layer thicknesses, etc.

An example of combination ranges which satisfy aforesaid formulae (3) or (4) are an absolute difference in the refractive indexes of the interior layer thermoplastic resins A and B of 0.1–0.2, a mean particle diameter of the light diffusing component (the islands component) of 5–15 $\mu$m, a volume fraction of the light diffusing component (the islands component) in the internal layer of 10–30% and an inner layer film thickness of 50–100 $\mu$m. It is of course possible to satisfy aforesaid formulae (3) or (4) outside of these ranges, for example in the following manner. Taking the aforesaid example as a basis, in the case where the difference between the refractive indexes of thermoplastic resins A and B is low, it is still possible to satisfy the formulae by raising the volume fraction of the light diffusing component (the islands component) or by increasing the thickness of the interior layer film. In the case where there is a large difference between the refractive indexes, in the opposite way it is possible to satisfy the formulae by lowering the volume fraction of the light diffusing component (the islands component) or by lowering the thickness of the interior layer film. Again, where the volume fraction of the light diffusing component (the islands component) or the thickness of the interior layer film are high/low, it is possible to satisfy the formulae by a corresponding decrease or increase in other factors (except for the mean particle diameter of the light diffusing component).

Taking into account thin film applications and usability, etc, the overall thickness of the light diffusing film is preferably 10–500 $\mu$m, more preferably 20–300 $\mu$m and still more preferably 30–200 $\mu$m. Again, with regard to the resin layer(s) on the surface, normally the thickness for a single side is selected from within the range 1–50 $\mu$m, preferably 2–30 $\mu$m and more preferably 3–20 $\mu$m.

The light diffusing film of the present invention preferably has an overall light transmittance of at least 60%, more preferably at least 70% and most preferably at least 80%. Again, the haze value of the light diffusing film of the present invention is preferably at least 80% and more preferably at least 90%. If the haze is less than 80%, there is an tendency for the collimated beam transmittance to be increased and, in such circumstances, luminance variation tend to be produced. However, depending on the particular application, there may be required a film of weak diffusion (for example as an upper light-diffusing film). To meet such a requirement, it is possible to control the refractive indexes of the resins forming the islands-in-a-sea structure, the volume fraction or the film thickness, etc. Here, the overall light transmittance and the haze can be measured by means of an integrating sphere type light transmittance measurement device (haze meter) based on Japanese Industrial Standard JIS K7105 "Test Methods for the Optical Properties of Plastics".

A method of producing the light diffusing film of the present invention is now explained but there is to be no restriction thereto.

With regard to the internal light-diffusing film, at the time of film production at least two types of thermoplastic resin may be kneaded in the extruder to produce an islands-in-a-sea structure. These thermoplastic resins may also be kneaded together and pellets produced before supply to the extruder, or the respective resin pellets may be blended at the time of supply and then kneaded by means of the extruder.

As a preferred method for the lamination of the internal light-diffusing film and the drawn film of crystalline polymer compound C, there is the method of lamination by co-extrusion. By co-extrusion, it is possible to obtain film having outstanding adhesion properties without an interposed adhesive layer. There is also the advantage that the lamination of the internal light-diffusing film and the drawn film can be carried out at one go in the same process, and there is no need for a separate process such as sticking together offline. In this way, the number of processes is lowered and high productivity can be realized.

For example, a mixture of specified quantities of thermoplastic resin A and thermoplastic resin B is supplied to a main extruder, while crystalline polymer compound C is supplied to a separate ancillary extruder, and molten three-layer co-extrusion is carried out with crystalline polymer compound C laminated at the two surfaces, after which cooling is performed on a casting drum by the electrostatic casting method and a three-layer laminated sheet thus obtained.

Furthermore, after the lamination by co-extrusion of the diffusing layer and the resin layers comprising crystalline polymer compound C, it is preferred that at least uniaxial drawing be carried out.

Depending on the type of crystalline polymer compound C, drawing of the three-layer laminated sheet is carried out by a factor of 3 to 6 in the lengthwise direction at a temperature higher than the glass transition temperature of the crystalline polymer compound C and then, following preheating to a temperature higher than the glass transition temperature of said crystalline polymer compound C on a stenter, drawing is carried out by a factor of 3 to 6 in the widthwise direction.

As a result of this drawing, there may be separation at the interface between the thermoplastic resin A and thermoplastic resin B, producing flat-shaped voids (lacunae) around the islands. If large flat-shaped voids are produced at this time, light is reflected by said voids, so that a light reflecting film tends to be formed and the light transmittance is reduced. Hence, in order to obtain a light diffusing film of high light transmission, after the lamination of the resin comprising the crystalline polymer compound to at least one face of the internal light-diffusing film, taking the melting point of the crystalline polymer compound C as $Tm_c$, its glass transition temperature as $Tg_c$ and the melting point of thermoplastic resin with the highest melting point amongst the thermoplastic resins used in the internal light-diffusing film as T2, it is preferred that there be included a heat treatment process at a temperature which satisfies the relations $Tm_c>T>T2$ and $T>Tg_c$. By heat treating at this temperature T, it is possible to eliminate or minimize voids utilizing the fluidity of the internal thermoplastic resin A, so that high light transmission can be manifested.

Furthermore, by heat-treating at a temperature lower than $Tm_c$, operational problems such as tackiness do not arise during the treatment process, and by heat-treating at a temperature higher than T2 it is possible both to eliminate or minimize internal voids and also to eliminate defects and flatten the surface. By heat-treating at a temperature higher than the $Tg_c$, the flowability of the surface layer thermoplastic resin is increased and the flattening treatment of the surface layer is facilitated. Here, there are no particular restrictions on which of T2 and $Tg_c$ is the greater.

Where T satisfies the relation $Tm_c>T$, effective surface heat treatment is possible but it is preferred that treatment be carried out at a temperature T which satisfies the relation $Tm_c>T+10$ (° C.), more preferably $Tm_c>T+20$ (° C.). Furthermore, in order to effectively eliminate internal defects, it is preferred that $T>T2+10$ (° C.) and still more preferably that $T>T2+20$ (° C.).

The heat treatment method may comprise, for example, the method of holding the film within an atmosphere of aforesaid temperature T while gripping the film edges, or the method of pressing a surface of temperature T against the film surface, but it is also possible to use other methods. The heat treatment in the present invention is normally carried out in a state with at least the internal light-diffusing film and the thermoplastic resin layer laminated by the aforesaid lamination method. In this way, it is possible to ensure flatness of the light diffusing film surface.

Again, in the present invention, it is also possible to form an antistatic layer, a hard coat layer or the like on the surface of the light diffusing film of the present invention.

(Methods for Evaluating Properties and for Confirming Effects)

A. Refractive Index

A sample was prepared by moulding pellets comprising a single thermoplastic resin into sheet using a hot press and then cooling (sheet thickness 100 $\mu$m). Using the sodium D line (wavelength 589 nm) as a light source, measurement of the refractive index was carried out using an Abbe refractometer.

B. Transmittance, Haze

The transmittance and haze were measured using a totally automatic direct-reading haze computer, model HGM-2DP, produced by Suga Test Instruments Co.

Furthermore, in the case of the measurement of the surface haze, the following templating procedure was employed.

[Film Surface Templating]

Condensation reaction type silicone SH9555 and corresponding hardening agent SH9555K produced by the Toray-Dow Corning Silicone Co. were mixed together at a weight ratio of 9:1, and air bubbles removed under vacuum while stirring for 20 minutes. Next, the mixed silicone rubber was coated onto 100 $\mu$m PET film and the sample surface to be templated placed thereon, and firmly pressed down with an ink roller. Heat treatment was then carried out for 30 minutes at 60° C., to cure the silicone rubber, after which the sample was peeled away, and a photo-polymerizing composition of the following formulation poured into the mould formed.

[Photopolymerizing Composition]

This comprised 50 parts of acrylic monomer Kayarad HX-620 (produced by the Nippon Kayaku Co.), 50 parts of chlorinated polyester oligomer Ebecryl EB-584 (produced by Daicel UCB), 10 parts of photopolymerization initiator Irgacure 184 (produced by Ciba Geigy Speciality Chemicals), and 2 parts of photopolymerization accelerator Kayacure EPA (produced by the Nippon Kayaku Co.)

After pouring-in this photopolymerizing composition, it was placed on 100 $\mu$m PET film as the base material, and pressed with an ink roller. Thereafter, curing was carried out by 1 J/cm² light exposure. By separation from the silicone mould, the required surface model was obtained. By measuring the haze for the model thus obtained, the surface haze was measured.

With regard to the internal haze, this was measured by immersing the film in a quartz cell in which was introduced a standard liquid of identical refractive index to that of the surface layer resin of the particular film. In order to provide the surface with other functions and to affix it to other components, the surface should be sufficiently smooth and, furthermore, even where thus affixed there should be no lowering of the light diffusion, so where the surface haze is no more than 10% and the internal haze is at least 50%, the film is given the evaluation O, otherwise it is evaluated as X.

C. Size of the Islands Component

A photo (transmission image) was taken at a magnification of 400 using an optical microscope, model BH-2, manufactured by the Olympus Optical Co., having an attached camera.

Using an image analyzer model V10LAB manufactured by Toyobo, the photo obtained was scanned-in as an image and the average particle diameter determined as follows. Any 200 particles were selected within an image area of 7 cm×9 cm and, by carrying out image processing, the average particle diameter was determined. During the image processing, for non-circular particles the particle diameter was determined by converting the measured area to that of a circle of identical area.

D. Lamination Thickness Ratio

A cross-section of the film was obtained by cutting and this then observed using a scanning electron microscope model S-2100A produced by Hitachi Ltd, and the lamination thickness ratio thereof measured.

E. Mechanical Properties

The flexural rigidity of the film was measured using a Pure Bending Tester KES-FB2A manufactured by Katotech K.K. Furthermore, confirmation was carried out as to whether or not the relation $M \geq M'$ was satisfied, where the flexural rigidity obtained is taken as M (N.m) and M' is the value satisfying the following relationship.

$$M' = 3 \times 10^8 \times \left(1 - \frac{\alpha^3}{2(\alpha+1)^3}\right) \times T_t^3$$

Furthermore, observation was carried out by eye as to whether or not there was any creasing or splitting of the sample edges in the process of cutting the sample for evaluation, and again as to whether or not there was film creasing at the time of handling so that crease marks were introduced. Where there was observed creasing or splitting at the time of cutting, or where traces of creasing were seen to be left at the time of handling, the film was given the evaluation X, otherwise it was evaluated as O.

F. Heat Resistance

The film was fitted to a backlight and with the light switched on for a continuous 100 hour period, observation was made of the extent of sagging due to the heat evolved from the unit. The backlight used for evaluation was a straight single bulb sidelight type backlight (14.1 inch) employed in a notebook personal computer. Where the film sagged and there were regions which lifted off from the light guide plate surface, it was given the evaluation X, while in the case where there was no change it was evaluated as O.

Furthermore, film sagging was also observed in the form of luminance variation within the film face. In the measurement, the backlight face (film face) was divided into 16 sections of 4×4, and the brightness was measured at each section 10 minutes after switching on the light (initial state) and again after the elapse of a continuous period of 100 hours. With the brightness in the initial state taken as 100, the percentage change in value after 100 hours was determined. For the calculation, there was used the value after deducting any change in the brightness of the backlight itself. The brightness was measured using a model LS-110 luminance meter made by Minolta. The maximum change in the 16 positions within the face was taken as $L_{max}$ and the minimum as $L_{min}$, and where the difference, that is to say the maximum variation within the surface, $L_{max}-L_{min}$ exceeded 10%, the film was given the evaluation X, where is was more than 5% but less than 10% it was given the evaluation Δ, and where it was less than 5% it was evaluated as O.

G. Diffusion Coefficients β, γ

Using, as the light source, a halogen light source device MHF-D100LR produced by Moritex K.K., this was connected to a MSG4-1100 straight light guide and an MLS-60P condenser to produce an approx. 5 mm collimated light beam. Furthermore, as the luminance meter there was used an LS-110 luminance meter produced by Minolta and, in this way, measurements were performed as follows.

[Measurement of Diffusion Coefficient β]

An incident light beam was directed perpendicular to the film face (the irradiated region was taken as the point of measurement) and the brightness of the emergent beam was measured at the opposite face using a luminance meter. $L_0$ was measured with the measurement point at a position perpendicular to the film face (parallel to the incident beam) and $L_{30}$ was measured from a position inclined 30° to the film face (a position inclined 30° to the incident light beam). β was calculated from the values of $L_0$ and $L_{30}$ thus obtained. Where β was greater than −1.5, the film was given the evaluation O and where it was −1.5 or less it was given the evaluation X.

[Measurement of Diffusion Coefficient γ]

An incident light beam was directed at 30° to the film face (the irradiated region was taken as the point of measurement) and the brightness of the emergent beam was measured at the opposite face using a luminance meter. $L'_0$ was measured with the measurement point at a position perpendicular to the film face and $L'_{30}$ was measured from a position parallel to the incident beam (a position inclined at 30° to the film face). γ was calculated from the values of $L_0$ and $L_{30}$ obtained. Where it was less than 1, the film was given the evaluation O and where it was 1 or more it was given the evaluation X.

H. Dot Hiding Ability

Observation was carried out by eye as to whether or not it was possible to distinguish a pattern of dots inscribed on the light guide plate, when the film was placed on the light guide plate of a backlight and the light turned on. In the case where the dots were indistinguishable and there was uniform good light distribution, this was taken as O, while in the case where the dot outline could be clearly seen this was taken as X. In-between these cases, where the outline was not visible but there was uneven light distribution, this was taken as Δ.

EXAMPLES

Below, the present invention is explained by means of examples.

Example 1

Pellets consisting of a mixture of 80 wt % polyester resin comprising polyethylene terephthalate (PET) in which 17 mol % isophthalic acid component had been copolymerized (resin melting point 210° C., density 1.35, glass transition temperature 70° C. and refractive index 1.58) and 20 wt % polymethylpentene (melting point 235° C., density 0.83 and refractive index 1.46), plus 0.5 wt % polyethylene glycol, was supplied to a main extruder. Furthermore, PET (melting point 265° C., density 1.35) was separately supplied to an ancillary extruder. By the specified method, molten three-layer co-extrusion with the PET as both surface layers was carried out, and by means of the electrostatic casting method cooling was carried out on the mirror face of the casting drum and a three-layer laminated sheet produced. The three-layer laminated sheet obtained in this way was drawn by a factor of 3.3 in the lengthwise direction at 90° C. and then passed through a 90° C. preheating zone by means of a stenter and drawing carried out by a factor of 3.5 in the widthwise direction at 95° C. By a further 20 seconds heat treatment at 230° C., a light diffusing film of overall film thickness 70 μm was obtained. The surface layer thickness was 7 μm on each side (lamination thickness ratio α=4)

The inner layer of the film obtained had an islands-in-a-sea structure in which the polyester resin containing 17 mol % copolymerized isophthalic acid component was the sea component and the polymethylpentene was the islands component. The islands component was of spherical shape and the average particle diameter was about 10 μm. The total light transmittance of the light diffusing film obtained was 85% and the haze was 92%. Furthermore, when the flexural rigidity of the film was measured, the film was found to show a high stiffness of $M=1.10\times10^{-4}$ N.m, which was the same as that of 66 μm biaxially-drawn PET film. Furthermore, $M>M'=0.77\times10^{-4}$ N.m.

When the film was cut to the specified size for obtaining evaluation samples, no defects were observed such as splitting of the edges. Furthermore, at the time of handling, there was no introduction of creasing (traces of creasing). Moreover, when the heat resistance was evaluated, no sagging of the film was observed after the passage of 100 hours from switching on the light. Again, in the case of the evaluation of heat resistance based on luminance variation, this was found to be outstanding with the maximum variation within the surface being 2.8%. Thus, a light diffusing film which was outstanding in its diffusion, transmittance, mechanical strength and heat resistance was obtained.

Example 2

Pellets consisting of a mixture of 80 wt % polyester resin comprising polyethylene terephthalate (PET) in which 23 mol % isophthalic acid component had been copolymerized (resin melting point 190° C., density 1.35, glass transition temperature 70° C. and refractive index 1.58) and 20 wt % polypropylene (melting point 170° C., density 0.90 and refractive index 1.50), was supplied to a main extruder. Furthermore, PET (melting point 265° C., density 1.35) was separately supplied to an ancillary extruder. By the specified method, molten three-layer co-extrusion with the PET as both surface layers was carried out, and by means of the electrostatic casting method cooling was carried out on the mirror face of the casting drum and a three-layer laminated sheet produced. The three-layer laminated sheet obtained in this way was drawn by a factor of 3.3 in the lengthwise direction at 90° C. and then passed through a 90° C. preheating zone by means of a stenter and drawing carried out by a factor of 3.5 in the widthwise direction at 95° C. By a further 20 seconds heat treatment at 230° C., a light diffusing film of overall film thickness 120 μm was obtained. The surface layer thickness was 10 μm on each side (lamination thickness ratio α=5).

The inner layer of the film obtained had an islands-in-a-sea structure in which the polyester resin containing 23 mol % copolymerized isophthalic acid component was the sea component and the polypropylene was the islands component. The islands component was of spherical shape and the average particle diameter was about 5 μm.

The total light transmittance of the light diffusing film obtained was 91% and the haze was 92%. Furthermore, the flexural rigidity was high at M=5.15×10$^{-4}$ N.m, which was the same as that of 110 μm biaxially drawn PET film. Furthermore, M>M'=3.69×10$^{-4}$ N.m. No defects were observed such as splitting of the edges at the time of cutting and no creases (traces of creasing) were introduced when handling. Moreover, when the heat resistance was evaluated, no sagging of the film was observed after the passage of 100 hours and, in terms of the luminance variation too, this was found to be outstanding with the maximum variation within the surface being 3.5%. Thus, light diffusing film which was outstanding in its diffusion, transmittance, mechanical strength and heat resistance was obtained.

Examples 3 to 5

In Example 1, molten three-layer co-extrusion was carried out and a three-layer laminated sheet produced, after which drawing was carried out at 90° C. in the lengthwise direction by a factor of 2.5 (Example 3) or 3 (Examples 4 and 5), then the film passed through a preheating zone at 90° C. by means of a stenter and drawn at 95° C. in the widthwise direction by a factor of 3 (Examples 3 and 4) or 3.5 (Example 5), and heat treatment carried out for 20 seconds at 230° C. By adjusting the line speed, in each case there was produced an overall film thickness of 70 μm and the surface layer thickness at each side was 7 μm in the same way as in Example 1 (lamination thickness ratio α=4). The total light beam transmittance and the haze of the light diffusing film obtained in each case were the same as in Examples 1. When the film flexural rigidity was measured, all the films showed high flexural rigidity, namely 1.00×10$^{-4}$ N.m (Example 3), 1.07×10$^{-4}$ N.m (Example 4) and 1.08×10$^{-4}$ N.m (Example 5).

Again, since the lamination thickness ratio α and the overall film thickness were the same in each case, the value of M' was also the same and M>M'=0.77×10$^{-4}$ N.m. Moreover, no defects such as splitting of the edges were noted at the time of cutting, and no creases (traces of creasing) were introduced at the time of handling. Furthermore, the evaluations of heat resistance were carried out in the same way but no film sagging was observed after the elapse of 100 hours and the maximum luminance variation within the face was excellent at 2.5%, 2.7% and 2.8% respectively.

Example 6

Pellets consisting of a mixture of 89.5 wt % non-crystalline polyester resin comprising polyethylene terephthalate (PET) in which 35 mol % cyclohexane-dimethanol component had been copolymerized (no crystallization peak, glass transition temperature 80° C.), 10 wt % polymethylpentene (melting point 235° C.) and 0.5 wt % polyethylene glycol, were supplied to a main extruder. Furthermore, PET (having a crystallization peak, melting point 265° C.) was separately supplied to an ancillary extruder. By the specified method, molten three-layer co-extrusion with the PET as both surface layers was carried out, and by means of the electrostatic casting method cooling was carried out on the mirror face of a casting drum and a three-layer laminated sheet obtained. The three-layer laminated sheet obtained in this way was drawn by a factor of 3 in the lengthwise direction at 90° C. and then passed through an 88° C. preheating zone by means of a stenter and drawing carried out by a factor of 3.3 in the widthwise direction at 90° C. By a further 30 seconds heat treatment at 230° C., a light diffusing film of overall film thickness 80 μm was obtained. The surface layer thickness was 8 μm on each side. The results are shown in Table 1. The overall light beam transmittance of the light diffusing film obtained was 90% and the haze was extremely good at 89%. In terms of flexural rigidity, a high stiffness of 1.30×10$^{-4}$ N.m was shown. This was the same as 70 μm biaxially drawn PET film, and it had adequate handling properties. Furthermore, in the evaluation of heat resistance using a backlight, the film was good both in terms of luminance variation and observation of sagging. Moreover, the film had high surface smoothness and performance enhancement by for example sticking to other components was easily carried out. Thus, light diffusing film which was outstanding in its optical properties, mechanical properties, heat resistance and practical characteristics was obtained.

Example 7

A three-layer laminated sheet was produced in the same way as in Example 6 except that there were supplied to the main extruder pellets consisting of a mixture of 80 wt % non-crystalline polyester resin comprising PET in which 20 mol % cyclohexanedimethanol component had been copolymerized (no crystallization peak, glass transition temperature 80° C.) and 20 wt % polymethylpentene (melting point 235° C.). Drawing and heat treatment were carried out and a light diffusing film of overall thickness 80 μm was obtained. The surface layer thickness was 8 μm on each side. The results are shown in Table 1. The overall light beam transmittance of the light diffusing film thus obtained was 74% and the haze was good at 90%. With regard to the breaking elongation, an essentially fixed value was maintained irrespective of time and the mechanical strength of the film obtained was excellent in its stability with passage of time. In terms of flexural rigidity, a high stiffness of 1.31×10$^{-4}$ N.m was shown and the film had adequate handling properties. Furthermore, the evaluation of heat resistance using a backlight was good both in terms of the luminance variation and the observation of sagging. Moreover, the film had high surface smoothness and performance enhancement by for example sticking to other materials was easily carried out. Thus, light diffusing film which was outstanding in its optical properties, mechanical properties, stability with passage of time, heat resistance and practical characteristics was obtained.

Example 8

A three-layer laminated sheet was produced in the same way as in Example 6 except that pellets consisting of a mixture of 95 wt % of non-crystalline polyester resin comprising PET in which 35 mol % cyclohexanedimethanol component had been copolymerized (no crystallization peak, glass transition temperature 80° C.) and 5 wt % polymethylpentene were supplied to the main extruder. Drawing and heat treatment were carried out and a light diffusing film of overall thickness 80 µm was obtained. The surface layer thickness was 8 µm on each side. The results are shown in Table 1. The overall light beam transmittance of the light diffusing film obtained was 90% and the haze was good at 76%. With regard to the breaking elongation, an essentially fixed value was maintained irrespective of time and the mechanical strength of the film obtained was excellent in its stability with passage of time. The flexural rigidity per unit thickness indicated a high stiffness of $1.31 \times 10^{-4}$ N.m, and the film had satisfactory handling properties. Furthermore, the evaluation of heat resistance using a backlight was good both in terms of the luminance variation and the observation of sagging. Moreover, the film had high surface smoothness and performance enhancement by for example sticking to other components was easily carried out. Thus, a light diffusing film which was outstanding in its optical properties, mechanical characteristics, stability with passage of time, heat resistance and practical characteristics was obtained.

Example 9

A three-layer laminated sheet was produced by supplying pellets consisting of a mixture of 90 wt % polyester resin comprising PET in which 17 mol % isophthalic acid had been copolymerized and 10 wt % polymethylpentene to a main extruder, supplying PET to an ancillary extruder and carrying out molten three-layer co-extrusion by the specified method with PET as both surface layers, followed by cooling on the mirror surface of a casting drum using the electrostatic casting method. The three layer laminated sheet obtained in this way was drawn by a factor of 3 at 90° C. in the lengthwise direction, then passed through a preheating zone at 90° C. with a stenter and drawn by a factor of 3.3 at 95° C. in the widthwise direction, followed by heat treatment for 20 seconds at 230° C. A light diffusing film of overall film thickness 50 µm was obtained. The thickness of the surface PET layers was 5 µm per side. The results are shown in Table 1.

The absolute value of the film flexural rigidity was low at $M = 0.45 \times 10^{-4}$ N.m, but $M > M' = 0.28 \times 10^{-4}$ N.m. Furthermore, there were no faults such as splitting of the edges, etc, and no introduction of traces of creasing. The heat resistance was also good.

Comparative Examples 1 to 3

No lamination of PET onto the surfaces in Example 1 was carried out and instead there was produced a simple film of just the inner layer internal light-diffusing film. Specifically, in the same way as in Example 1, there was supplied to the extruder pellets consisting of a mixture of 95 wt % (Comparative Example 1), 90 wt % (Comparative Example 2) or 80 wt % (Comparative Example 3) of a polyester resin comprising polyethylene terephthalate (PET) in which 17 mol % of isophthalic acid component had been polymerized (resin melting point 210° C., density 1.35, glass transition temperature 70° C. and refractive index 1.58) and 5 wt % (Comparative Example 1), 10 wt % (Comparative Example 2) or 20% (Comparative Example 3) of polymethylpentene (melting point 235° C., density 0.83, refractive index 1.46), and then extrusion carried out, followed by cooling on the mirror face of a casting drum using the electrostatic casting method, to produce simple light diffusing film. In such circumstances, when drawing and heat treatment were carried out, since the heat treatment temperature was higher than the melting point of the sea component the film melted and film production was impossible. Hence, light diffusing film was obtained in the form of an undrawn extruded sheet. The film thickness was made 70 µm in the same way as in Example 1.

As shown in Table 1, the flexural rigidity of the film obtained was reduced to about half that in the case where biaxially drawn PET film was laminated.

Furthermore, the splitting produced at the edges at the time of cutting was severe and moreover creases (traces of creasing) were readily introduced. Such creases whitened and remained in the film, which was of course evaluated as being unsuitable for use as a final product. Again, when fitted to the backlight and the light switched on, after the elapse of 100 hours it was confirmed by eye that sagging had clearly been produced. Furthermore, the maximum luminance variation within the surface exceeded 10%, which is undesirable.

Comparative Example 4

In Example 1, polycarbonate (non-crystalline) was laminated to both surfaces instead of the PET. The drawing process was omitted and undrawn three-layer laminated sheet produced. In the same way as in the examples, there was produced sheet of overall film thickness 70 µm, where the thickness of the surface polycarbonate layer was 7 µm per side (lamination thickness ratio α=4).

The total light transmittance of the light diffusing film thus obtained was 86% and the haze 91%, so it was a film of high transmittance and diffusion. However, when the flexural rigidity was measured, it was found to be $0.56 \times 10^{-4}$ N.m, so this had been reduced to about half that in the case where biaxially-oriented PET film was laminated. Furthermore, $M < M' = 0.77 \times 10^{-4}$ N.m. Again, the splitting produced as the edges at the time of cutting was severe, and furthermore creases (traces of creasing) were readily introduced. Such creases whitened and remained in the film, which was of course evaluated as being unsuitable for use as a final product. Again, when fitted to the backlight and the light switched on, after the elapse of 100 hours it was confirmed by eye that sagging had clearly been produced. Furthermore, the maximum luminance variation within the surface also exceeded 10%. Thus, the light diffusing film obtained was undesirable in practical terms.

TABLE 1

| Mechanical Properties | | Brightness | | |
| --- | --- | --- | --- | --- |
| flexural stiffness | observed traces | Heat Resistance | luminance variation | Diffusion Properties diffusion |

| | Trasmittance (%) | Haze (%) | Surface Haze | $10^{-4} \times$ N*m | creasing, splitting | of creasing | observed sagging | within face (%) | coefficient $\beta$ | diffusion coefficient $\gamma$ | dot hiding ability |
|---|---|---|---|---|---|---|---|---|---|---|---|
| Example 1 | 85 | 92 | 0.7 | 1.1 | ○ | ○ | ○ | ○ | −0.75 | 0.69 | ○ |
| Example 2 | 91 | 92 | 0.9 | 5.15 | ○ | ○ | ○ | ○ | −0.6 | 0.3 | ○ |
| Example 3 | 85 | 92 | 0.8 | 1 | ○ | ○ | ○ | ○ | −0.74 | 0.7 | ○ |
| Example 4 | 85 | 92 | 0.7 | 1.07 | ○ | ○ | ○ | ○ | −0.74 | 0.71 | ○ |
| Example 5 | 85 | 92 | 0.7 | 1.08 | ○ | ○ | ○ | ○ | −0.75 | 0.7 | ○ |
| Example 6 | 90 | 89 | 0.7 | 1.3 | ○ | ○ | ○ | ○ | −0.77 | 0.74 | ○ |
| Example 7 | 74 | 90 | 1 | 1.31 | ○ | ○ | ○ | ○ | −0.79 | 0.71 | ○ |
| Example 8 | 90 | 76 | 0.6 | 1.31 | ○ | ○ | ○ | ○ | −1.7 | 1.71 | Δ |
| Example 9 | 91 | 79 | 0.6 | 0.45 | ○ | ○ | ○ | ○ | −1.61 | 1.52 | Δ |
| Comp. Ex. 1 | 93 | 78 | −17.8 | 0.59 | X | X | X | X | −1.7 | 1.69 | Δ |
| Comp. Ex. 2 | 90 | 88 | 18.6 | 0.54 | X | X | X | X | −0.72 | 0.54 | ○ |
| Comp. Ex. 3 | 90 | 91 | 20.5 | 0.52 | X | X | X | X | −0.67 | 0.39 | ○ |
| Comp. Ex. 4 | 86 | 91 | 1.2 | 0.56 | X | X | X | X | −0.74 | 0.68 | ○ |

INDUSTRIAL UTILIZATION POTENTIAL

In accordance with the present invention, while keeping the surface smooth it is possible to obtain a light diffusing film which is outstanding in its light transmission, light diffusion, mechanical strength and productivity.

The light diffusing film of the present invention has a smooth surface and also has high light transmittance and high light diffusion, so by use for example in the backlight of a liquid crystal display, it is possible to provide a high quality image which is uniform and of high brightness.

What is claimed is:

1. A light diffusing film comprising:

a film comprising crystalline polymer compound C which is drawn and laminated to at least one face of an internal light-diffusing film comprising an islands-in-a-sea structure comprising a sea component of thermoplastic resin A and an islands component of thermoplastic resin B, wherein thermoplastic resins A and B have different refractive indexes, wherein flexural rigidity M (N.m) satisfies formula (2):

$$M \geq 3 \times 10^8 \times \left(1 - \frac{a^3}{2(\alpha+1)^3}\right) \times T_t^3 \qquad (2)$$

wherein the overall thickness of the light diffusing film is $T_t$ (m) and $\alpha$ is the lamination thickness ratio expressed by formula (1):

$$\alpha = \frac{T_a}{T_b}, \qquad (1)$$

wherein $T_a$=film thickness of the internal light-diffusing film and $T_b$=total film thickness of the drawn film comprising crystalline polymer compound C.

2. The light diffusing film according to claim 1, wherein the crystalline polymer compound C is a polyester resin.

3. The light diffusing film according to claim 1, wherein the thickness of the internal light-diffusing film is at least 50% of the total film thickness.

4. The light diffusing film according to claim 1, wherein a lamination thickness ratio ($\alpha$) expressed by formula (1) is no more than 15

$$\alpha = \frac{T_a}{T_b}, \qquad (1)$$

5. The light diffusing film according to claim 1, wherein thermoplastic resin A comprises a non-crystalline resin.

6. The light diffusing film according to claim 5, wherein the non-crystalline resin is a polyester resin.

7. The light diffusing film according to claim 1, wherein the internal light-diffusing film and the film comprising crystalline polymer compound C are laminated without an adhesive agent layer inter posed therebetween.

8. The light diffusing film according to claim 1, further comprising a resin layer comprising thermoplastic resin having a melting point higher than that of the thermoplastic resins A and B laminated to one or both faces of the light diffusing film.

9. A method for producing the light diffusing film according to claim 1, comprising:

melting and co-extruding 1) a resin layer comprising the crystalline polymer compound C and 2) thermoplastic resins A and B contained in the internal light-diffusing film;

uniaxially or biaxially stretching the resulting laminated film; and heat treating the laminated film.

10. The method for producing the light diffusing film according to claim 9, wherein heat treatment is carried out at a temperature T which satisfies the relations $Tm_c > T > T_2$ and $T > Tg_c$, wherein $Tm_c$ is the melting point of the crystalline polymer compound C, $Tg_c$ is the glass transition temperature and $T_2$ is the melting point of the thermoplastic resin of highest melting point from amongst the thermoplastic resins A and B.

11. A light diffusing film comprising:

a film comprising crystalline polymer compound C which is drawn and laminated to;

at least one face of an internal light-diffusing film comprising an islands-in-a-sea structure comprising a sea component of thermoplastic resin A and an islands component of thermoplastic resin B, wherein thermoplastic resins A and B have different refractive indexes, and wherein, when a collimated beam of visible light is incident perpendicular to the at least one film face and, taking as a measurement position an opposite face at the position of incidence, a measurement of brightness of the light beam emerging from said measurement position is made, and diffusion coefficient $\beta$ defined by formula (3) satisfies the relation $-1.5 < \beta$:

$$\beta = \log_{10} \frac{L_{30}}{L_0}, \qquad (3)$$

wherein $L_0$ is brightness obtained in the perpendicular direction and $L_{30}$ is brightness obtained in a direction inclined 30° from the perpendicular direction centered on the measurement position.

12. The light diffusing film according to claim 11, wherein, when a collimated beam of visible light is incident at 30° to the perpendicular direction of the at least one film face and, taking as the measurement position the opposite face at the position of incidence, a measurement of brightness of the light beam emerging from said measurement position, and diffusion coefficient γ defined by formula (4) satisfies the relation γ<1:

$$\gamma = \log_{10} \frac{L'_{30}}{L'_0}, \qquad (4)$$

wherein $L'_0$ is brightness obtained in the perpendicular direction and $L'_{30}$ is brightness obtained in a direction parallel to the incident beam and inclined 30° from the perpendicular direction centered on the measurement position.

* * * * *

UNITED STATES PATENT AND TRADEMARK OFFICE
CERTIFICATE OF CORRECTION

PATENT NO. : 6,881,473 B2
DATED : April 19, 2005
INVENTOR(S) : Takahashi et al.

It is certified that error appears in the above-identified patent and that said Letters Patent is hereby corrected as shown below:

Column 21,
Table 1, at subtitle "Surface Haze", please change "-17.8" to -- 17.8 --.

Signed and Sealed this

Twenty-second Day of November, 2005

JON W. DUDAS
*Director of the United States Patent and Trademark Office*